US006924864B2

(12) United States Patent
Kim (10) Patent No.: US 6,924,864 B2
(45) Date of Patent: Aug. 2, 2005

(54) ARRAY SUBSTRATE FOR IN-PLANE SWITCHING MODE LIQUID CRYSTAL DISPLAY DEVICE AND METHOD OF FABRICATING THE SAME

(75) Inventor: Ik Soo Kim, Gunpo-si (KR)

(73) Assignee: LG.Philips LCD Co., Ltd., Seoul (KR)

(*) Notice: Subject to any disclaimer, the term of this patent is extended or adjusted under 35 U.S.C. 154(b) by 25 days.

(21) Appl. No.: 10/330,124

(22) Filed: Dec. 30, 2002

(65) Prior Publication Data

US 2003/0122990 A1 Jul. 3, 2003

(30) Foreign Application Priority Data

Dec. 31, 2001 (KR) ................................ 10-2001-0088750

(51) Int. Cl.$^7$ .......................................... G02F 1/1343
(52) U.S. Cl. .......................... 349/141; 349/38; 349/39; 349/139
(58) Field of Search ........................ 349/38, 43, 139, 349/141

(56) References Cited

U.S. PATENT DOCUMENTS

| | | | |
|---|---|---|---|
| 5,598,285 A | 1/1997 | Kondo et al. | 349/39 |
| 5,745,207 A | 4/1998 | Asada et al. | 349/141 |
| 5,838,037 A | 11/1998 | Masutani et al. | 257/296 |
| 5,946,060 A | 8/1999 | Nishiki et al. | 349/48 |
| 5,990,987 A | 11/1999 | Tanaka | 349/43 |
| 6,028,653 A | 2/2000 | Nishida | 349/141 |
| 6,097,454 A | 8/2000 | Zhang et al. | 349/43 |
| 6,108,065 A * | 8/2000 | Ota et al. | 349/141 |
| 6,208,399 B1 * | 3/2001 | Ohta et al. | 349/139 |
| 6,452,656 B2 * | 9/2002 | Niwano et al. | 349/141 |

FOREIGN PATENT DOCUMENTS

| | | |
|---|---|---|
| JP | 09-005764 | 1/1997 |
| JP | 09-073101 | 3/1997 |
| JP | 09-101538 | 4/1997 |
| JP | 09-105908 | 4/1997 |

OTHER PUBLICATIONS

R. Kieler et al.; "In–Plane Switching of Nematic Liquid Crystals"; Japan Display '92; pp. 547–550.
M. Oh–e, et al.; "Principles and Characteristics of Electro–Optical Behaviour with In–Plane Switching Mode"; Asia Display '95; pp. 577–580.
M. Ohta et al.; "Development of Super–TFT–LCDs with In–Plane Switching Display Mode"; Asia Display '95; pp. 707–710.
S. Matsumoto et al.; Display Characteristics of In–Plane Switching (IPS) LCDs and a Wide–Viewing–Angle 14.5–in. OPS TFT–LCD; Euro Display '96; pp. 445–448.
H. Wakemoto et al.; "An Advanced In–Plane Switching Mode TFT–LCD"; SID 97 Digest; pp. 929–932.
S.H. Lee et al.; High–Transmittance, Wide–Viewing–Angle Nematic Liquid Crystal Display Controlled by Fringe–Field Switching; Asia Display '98; pp. 371–374.
S. Endoh et al.; "Advanced 18.1 Inch Diagonal Super–T-FT–LCDs with Mega Wide Viewing Angle and Fast Response Speed of 20ms"; IDW '99; pp. 187–190.

* cited by examiner

*Primary Examiner*—Dung T. Nguyen
*Assistant Examiner*—Michael H Caley
(74) *Attorney, Agent, or Firm*—McKenna Long & Aldridge LLP (57) ABSTRACT

The present invention is related to an IPS-LCD device and a method of fabricating an array substrate for use in the IPS-LCD device, which increase a high aperture ratio and a large and enough storage capacitance. A pixel and common electrodes of the IPS-LCD device are formed of an transparent conductive material so as to increase the aperture ratio. A drain electrode and a portion of a common line form a first storage capacitor, and additionally, a portion of the pixel electrode and a portion of the gate line form a second storage capacitor. Therefore, the capacitance of the IPS-LCD device can be raised due to the two storage capacitor.

22 Claims, 5 Drawing Sheets

FIG. 1

*(Related Art)*

ARRAY SUBSTRATE FOR IN-PLANE SWITCHING MODE LIQUID CRYSTAL DISPLAY DEVICE AND METHOD OF FABRICATING THE SAME

This application claims the benefit of Korean Patent Application No. 2001-0088750, filed on Dec. 31, 2001, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate for use in an in-plane switching mode liquid crystal display device (IPS-LCD).

2. Description of the Related Art

A liquid crystal display device uses the optical anisotropy and polarization properties of liquid crystal molecules to produce an image. Liquid crystal molecules have a definite alignment direction as a result of their long, thin shapes. That alignment direction can be controlled by an applied electric field. In other words, as an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs) and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a conventional LCD device, since the pixel and common electrodes are positioned on the lower and upper substrates, respectively, the electric field induced between them is perpendicular to the lower and upper substrates. However, the conventional LCD devices having the longitudinal electric field have a drawback in that they have a very narrow viewing angle. In order to solve the problem of narrow viewing angle, in-plane switching liquid crystal display (IPS-LCD) devices have been proposed. The IPS-LCD devices typically include a lower substrate where a plurality of pixel electrodes and common electrodes are disposed, an upper substrate having no electrode, and a liquid crystal interposed between the upper and lower substrates. A detailed explanation about the lower substrate (i.e., array substrate) of the IPS-LCD device will be provided referring to figures.

Figure 1:
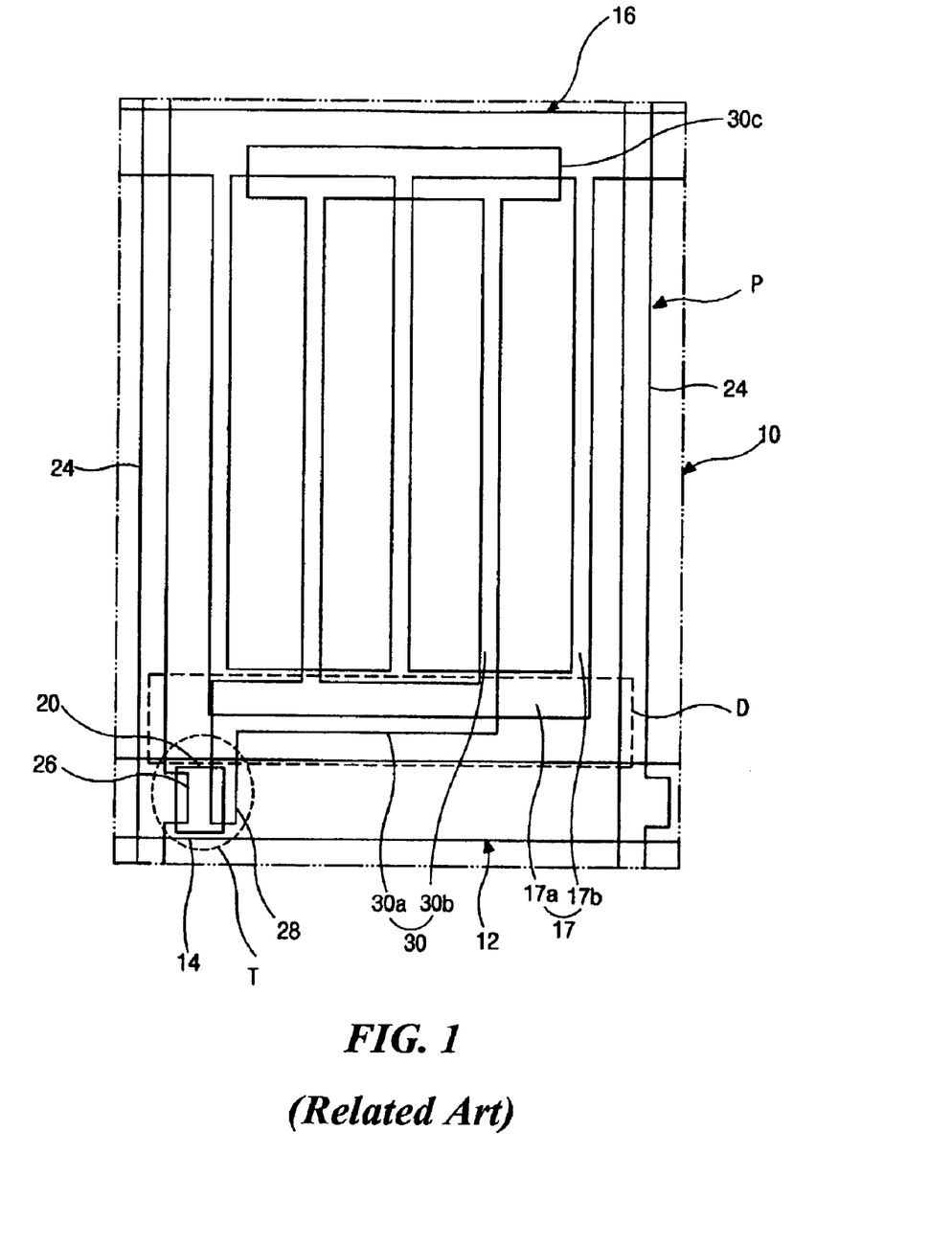
FIG. 1 is a schematic plan view illustrating one pixel of an array substrate of an in-plane switching mode liquid crystal display (IPS-LCD) device according to a related art.

FIG. 1 is a schematic plan view illustrating one pixel of an array substrate of an in-plane switching mode liquid crystal display (IPS-LCD) device according to a related art. As shown, a gate line 12 is transversely disposed on a substrate 10. A common line 16 is spaced apart from and disposed parallel with the gate line 12. Data lines 24 that are spaced apart from each other are disposed across and substantially perpendicular to the gate and common lines 12 and 16. A pair of data lines 24 and a pair of gate and common lines 12 and 16 define a pixel region P.

A switching device, i.e., a thin film transistor T, is positioned near the crossing of the gate and data lines 12 and 24. As shown in FIG. 1, the thin film transistor T includes a gate electrode 14, an active layer 20, a source electrode 26 and a drain electrode 28. The gate electrode 14 is a portion of the gate line 12 near the data line 24, and the source electrode 26 protrudes from the data line 24 over the gate electrode 14. Namely, the portion of the gate line 12 near the data line 24 acts as a gate electrode and the source electrode 26 is electrically connected to the data line 24. The drain electrode 28 is spaced apart from the source electrode 26 and overlaps a portion of the gate electrode 14. The active layer 20 is located above the gate electrode 14 and under the source and drain electrodes 26 and 28. Thus, the source electrode 26 and the drain electrode 28 overlap opposite portions of the active layer 20, respectively.

A pixel electrode 30 connected to the drain electrode 28 is disposed in the pixel region P. A common electrode 17 that is connected to the common line 16 is also disposed in the pixel region P. The pixel electrode 30 includes a first horizontal pixel portion 30a, a plurality of vertical pixel portions 30b and a second horizontal pixel portion 30c. The first horizontal pixel portion 30a is connected to the drain electrode 28 and disposed adjacent to and parallel with the gate line 12. The plurality of vertical pixel portions 30b extends from the first horizontal pixel portion 30a substantially parallel with the data lines 24 and are spaced apart from one another. The second horizontal pixel portion 30c is disposed over the common line 16 and connects the other ends of the plurality of vertical pixel portion 30b. The horizontal and vertical pixel portions 30a, 30b and 30c and the drain electrode 28 are formed as one united body. The common electrode 17 includes a horizontal common portion 17a and a plurality of vertical common portions 17b. The plurality of vertical common portions 17b extend from the common line 16 and each of the vertical common portions 17b is disposed between the horizontal pixel portions 30b. The horizontal common portion 17a is disposed adjacent to the gate line 12 and connects the plurality of vertical common portions 17b. The horizontal and vertical common portions 17a and 17b are formed as one united body with the common line 16.

In the above-mentioned structure of the related art shown in FIG. 1, a region D between the gate line 12 and the horizontal pixel and common portions 30a and 17a becomes a non-display area because the electric field generated in the region D is different from that generated in the area between the vertical pixel portion and the vertical common portion. The region D of FIG. 1 cannot display the images, and thus the aperture ratio and brightness of the IPS-LCD device decreases. Furthermore, due to the fact that the IPS-LCD device shown in FIG. 1 has the common and pixel electrodes that are made of an opaque material, the aperture ratio and brightness are further reduced.

SUMMARY OF THE INVENTION

Accordingly, the present invention is directed to an IPS-LCD device that substantially obviates one or more of the problems due to limitations and disadvantages of the related art.

An advantage of the present invention is to provide a method of fabricating an array substrate for use in the IPS-LCD device (as well as the array substrate itself), which has an improved aperture ratio and brightness.

Another advantage of the present invention is to provide the method of fabricating the array substrate (as well as the array substrate itself) for use in the IPS-LCD device, which is designed to have an improved capacitance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the preferred embodiment of the present invention provides an array substrate for an IPS-LCD device, including: a substrate; gate and common lines on the substrate in a first direction; a gate insulation layer on the substrate to cover the gate and common lines; a data line on the gate insulation layer in a second direction substantially perpendicular to the gate and common lines; a thin film transistor at a crossing of the gate and data lines, the thin film transistor including a gate electrode, an active layer, a source electrode, and a drain electrode; a passivation layer on the gate insulation layer, the passivation layer covering the thin film transistor and the data line and having first and second contact holes; a pixel electrode on the passivation layer, the pixel electrode contacting the drain electrode through the first contact hole; and a common electrode on the passivation layer, the common electrode contacting the common line through the second contact hole.

In another aspect, the preferred embodiment of the present invention is to provide a method of fabricating an array substrate for use in an IPS-LCD device. According to the present invention, the method include: forming gate and common lines on a substrate in a first direction; forming a gate insulation layer on the substrate to cover the gate and common lines; forming a data line on the gate insulation layer in a second direction substantially perpendicular to the gate and common lines; forming a thin film transistor at a crossing of the gate and data lines, the thin film transistor including a gate electrode, an active layer, a source electrode, and a drain electrode; forming a passivation layer on the gate insulation layer so as to cover the thin film transistor and the data line, the passivation layer having first and second contact holes; and forming both a pixel electrode and a common electrode on the passivation layer, the pixel electrode contacting the drain electrode through the first contact hole and the common electrode contacting the common line through the second contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE ILLUSTRATED EMBODIMENTS

Reference will now be made in detail to an illustrated embodiment of the present invention, an example of which is shown in the accompanying drawings. Wherever possible, similar reference numbers will be used throughout the drawings to refer to the same or similar parts.

Figure 2:
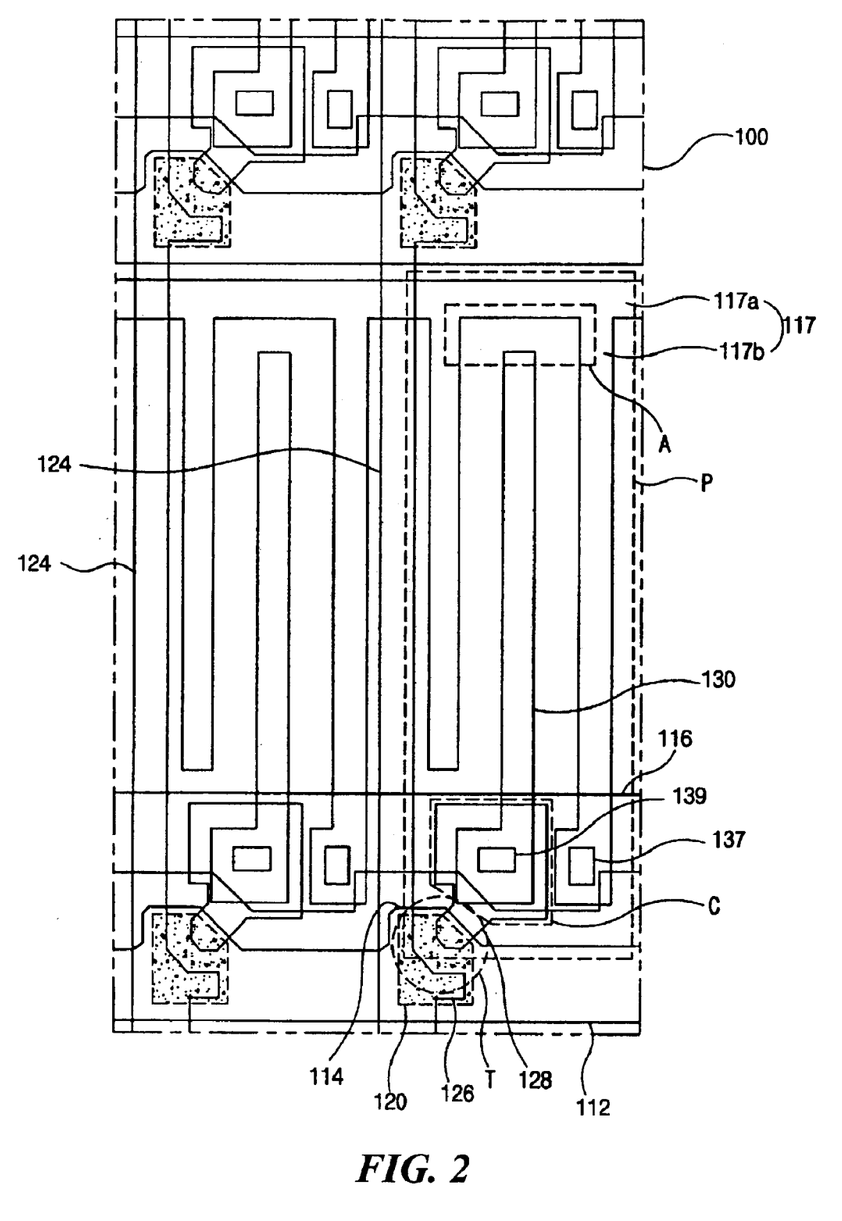
FIG. 2 is a schematic plan view illustrating pixels of an array substrate of an in-plane switching mode liquid crystal display (IPS-LCD) device according to a first embodiment of the present invention.

FIG. 2 is a schematic plan view illustrating pixels of an array substrate of an in-plane switching mode liquid crystal display (IPS-LCD) device according to a first embodiment of the present invention. As shown, gate lines 112 are transversely disposed on a substrate 100. A common line 116 is spaced apart from and disposed substantially parallel with and adjacent to the gate lines 112. Data lines 124 that are spaced apart from each other are disposed across and substantially perpendicular to the gate and common lines 112 and 116. A pair of gate and common lines 112 and 116 and a pair of data lines 124 define a pixel region P.

A switching device, e.g., a thin film transistor (TFT), which is indicated by a portion T in the figure, is positioned near the crossing of the gate and data lines 112 and 124. As shown in FIG. 2, the thin film transistor T includes a gate electrode 114, an active layer 120, a source electrode 126 and a drain electrode 128. The gate electrode 114 extends from the gate line 112 and the source electrode 126 extends from the data line 124 over the gate line 112. The drain electrode 128 is spaced apart from the source electrode 126 and overlaps a portion of the gate electrode 114. An active layer 120 is located above the gate electrode 114 to overlap the gate electrode 114 and under the source and drain electrodes 126 and 128. The source electrode 126 overlaps one side of the active layer 120 and the drain electrode 128 overlaps the other side of the active layer 120. The drain electrode 128 extends over the common line 116 and has a quadrangular portion within the common line 116.

A pixel electrode 130 and a common electrode 117 are disposed in the pixel region P. The pixel electrode 130 is disposed substantially parallel with the data line 124 and extends over the drain electrode 128. The common electrode 117 includes a horizontal portion 117a and a plurality of vertical portions 117b. The horizontal portion 117a is disposed adjacent to the gate line 112 of the upper neighboring pixels and connects the vertical common electrode of the horizontally neighboring pixels. The plurality of vertical portions 117b extend from the horizontal portion 117a and are substantially parallel with the data lines 124. One of the vertical portions 117b of the common electrode 117 extends over the common line 116 and contacts the common line 116 through a first contact hole 137. The pixel electrode 130 and the common electrode 117 are formed of a transparent conductive material so as to increase the aperture ratio of the IPS-LCD device.

As mentioned just before, one of the vertical portions 117b is electrically connected with the common line 116 via the first contact hole 137 in order to receive an electrical signal from the common line 116, whereas the pixel electrode 130 contacts the drain electrode 128 through a second contact hole 139 in order to receive an electrical signal from the thin film transistor T. A storage capacitor C is formed of a portion of the common line 116 and the quadrangular portion of the drain electrode 128 with an insulator (not shown) interposed between the common line 116 and the drain electrode 128 so that it acts as a dielectric layer in the storage capacitor C. In the storage capacitor C, the portion of the common line 116 acts as a first capacitor electrode and the quadrangular portion of the drain electrode 128 acts as a second capacitor electrode.

In the first embodiment of the present invention, because the pixel electrode 130 and the common electrode 117 are made of the transparent conductive material, the aperture ratio and brightness of the IPS-LCD increase. However, in an area A of FIG. 2 that is an interval between the pixel electrode 130 and the horizontal portion 117a of the common electrode, a distortional arrangement of the liquid crystal molecules may occur and thus the IPS-LCD may not have an improved aperture ratio and may not properly display images. Moreover, because a portion of the drain electrode 128 forms the storage capacitor, the capacitance of the storage capacitor may not be enough. Therefore, another capacitor structure configuration may be required in the array substrate for used in a IPS-LCD device.

Figure 3:
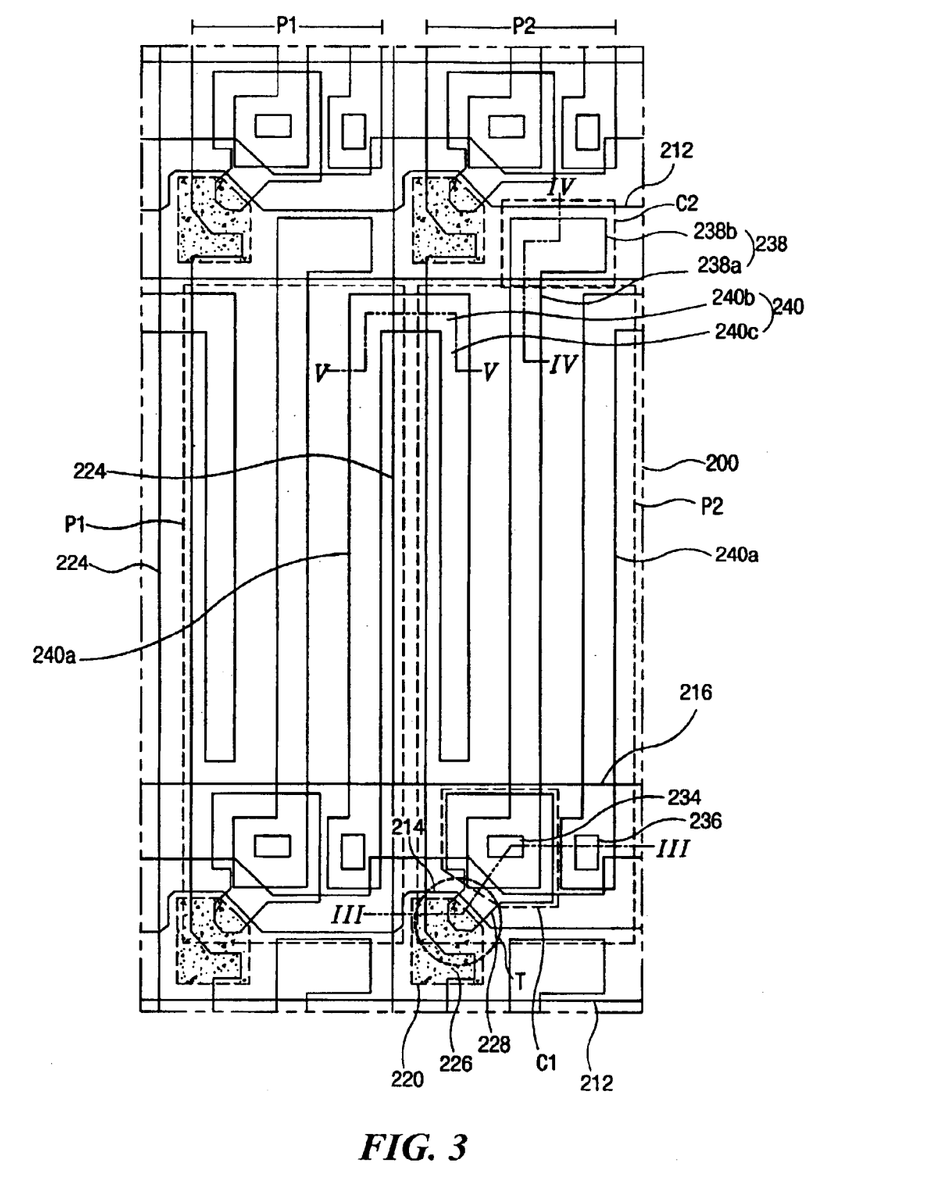
FIG. 3 is a schematic plan view illustrating pixels of an array substrate of an in-plane switching mode liquid crystal display (IPS-LCD) device according to a second embodiment of the present invention.

FIG. 3 is a schematic plan view illustrating pixels of an array substrate of an in-plane switching mode liquid crystal display (IPS-LCD) device according to a second embodiment of the present invention. The array substrate shown in FIG. 3 is similar to that of the first embodiment shown in FIG. 2, but has a different structure and configuration. As shown, gate lines 212 are transversely disposed on a substrate 200. A common line 216 is spaced apart from and disposed substantially parallel with and adjacent to the gate line 212. Data lines 224 that are spaced apart from each other are disposed across and substantially perpendicular to the gate and common lines 212 and 216. A pair of gate and common lines 212 and 216 and a pair of data lines 224 define pixel regions P1 and P2.

As shown in FIG. 3, a switching device, e.g., a thin film transistor (TFT), which is indicated by a portion T in the figure, is positioned near the crossing of the gate and data lines 212 and 224. The thin film transistor T includes a gate electrode 214, an active layer 220, a source electrode 226 and a drain electrode 228. The gate electrode 214 extends from the gate line 212, and the source electrode 226 extends from the data line 224 over the gate line 212. The drain electrode 228 is spaced apart from the source electrode 226 and overlaps a portion of the gate electrode 214. An active layer 220 is located above the gate electrode 214 and under the source and drain electrodes 226 and 228 and overlaps a portion of the gate electrode 114. The source electrode 226 overlaps one portion of the active layer 220, and the drain electrode 228 overlaps the other portion of the active layer 220. The drain electrode 228 extends over the common line 216 and has a quadrangular portion within the common line 216.

In each pixel region P1 or P2, a pixel electrode 238 and a common electrode 240 are disposed. The pixel electrode 238 includes a vertical portion 238a and a top horizontal portion 238b. The vertical portion 238a of the pixel electrode 238 crosses each pixel region P1 or P2 and extends over the drain electrode 228. The bottom of the vertical portion 238a contacts the quadrangular portion of the drain electrode 228 through a dram contact hole 234. The top horizontal portion 238b of the pixel electrode is disposed over the gate line 212 of the upper neighboring pixels. Furthermore, the top horizontal portion 238b extends along the gate line 212 of the upper neighboring pixels. The common electrode 240 includes first and second common electrodes 240a and 240c and a common connector 240b. The first and second common electrodes 240a and 240c are substantially parallel with the data lines 224 and disposed adjacent to the data line 224. The first and second common electrodes 240a and 240c cross the pixel regions P1 (and P2), and the first common electrodes 240a extends over the common line 216 and contacts the common line 216 through a common contact hole 236. The common connector 240b crosses the data line 224 and connects the first common electrode 240a of the pixel region P1 and the second common electrode 240c of the neighboring pixel region P2. Namely, the first common electrode 240a is connected to the second common electrode of the neighboring pixel, and on the contrary, the second common electrode 240c is connected to the first common electrode of the neighboring pixel. In the second embodiment, the pixel and common electrodes 238 and 240 are also made of a transparent conductive material.

As compared to the first embodiment of the present invention, the array substrate of the second embodiment does not have the horizontal portion 117a of the common electrode 117 of FIG. 2, and thus the distortion of the liquid crystal molecules does not occur and the aperture ratio is improved. Furthermore, there are two storage capacitors C1 and C2 in the array substrate of the present invention. The first storage capacitor C1 is formed of the portion of the common line 216 and the quadrangular portion of the drain electrode 228 like the first embodiment, and the second storage capacitor C2 is formed of a portion of the gate line 212 and the top horizontal portion 238b of the pixel electrode 238. The first and second storage capacitor C1 and C2 have a dielectric layer therein. Since the array substrate of the second embodiment has two storage capacitors C1 and C2, it can obtain an enough capacitance. Namely, the additional storage capacitor C2 increases the capacitance as compared to the first embodiment.

FIGS. 4A to 4D are cross sectional views taken alone lines III—III, IV—IV and V—V of FIG. 3 and illustrate fabricating processes for the array substrate according to the present invention.

Figure 4A:
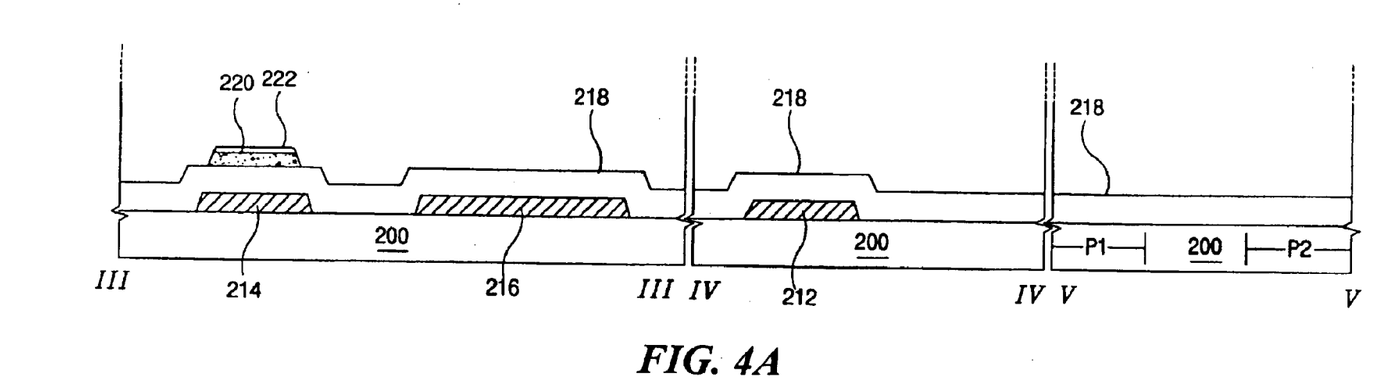
FIGS. 4A to 4D are cross sectional views taken along lines III—III, IV—IV and V—V of FIG. 3 and illustrate fabricating processes for the array substrate according to the present invention.

Referring to FIG. 4A, a first metal layer is formed on a substrate 200 and then patterned to form the gate line 212, the gate electrode 214, the common line 216. Aluminum (Al), aluminum alloy (e.g., aluminum neodymium (AlNd)), chromium (Cr), molybdenum (Mo), tungsten (W) or the like is used as a material for the first metal layer, for example. The gate line 212 and the common line 216 are arranged in a first direction on the substrate, as shown in FIG. 3. The gate electrode 214 extends from the gate line 212. The common line 216 is adjacent to and substantially parallel with the gate line 212. Further, the common line 216 is spaced apart from the gate line 212 by a predetermined distance. Thereafter, a gate insulation layer 218 is formed on entire surface of the substrate 200 to cover the patterned first metal layer. Thus, as shown in FIG. 4A, the gate insulation layer 218 covers the gate electrode 214, the gate line 212 and the common line 216. The gate insulation layer 218 is an inorganic material, such as silicon nitride ($SiN_x$) or silicon oxide ($SiO_x$). After forming the gate insulation layer 218, an amorphous silicon layer (a-Si:H) and an impurity-doped amorphous silicon layer ($n^+$ a-Si:H) are sequentially formed on the gate insulation layer 218 and then patterned to form the active layer 220 and an ohmic contact layer 222. Particularly, the active layer 220 and the ohmic contact layer 222 are formed right above the gate electrode 214 to overlap the gate electrode 214. Since the amorphous silicon layer (a-Si:H) and the impurity-doped amorphous silicon layer ($n^+$ a-Si:H) are simultaneously patterned, the active layer 220 is interposed between the ohmic contact layer 222 and the gate insulation layer 218.

Figure 4B:
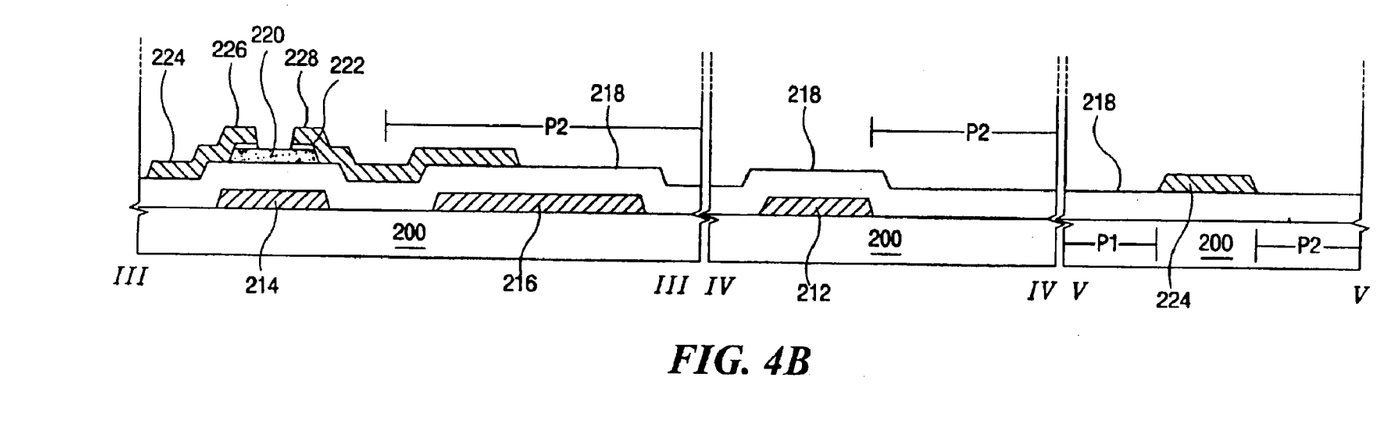

Now in FIG. 4B, a second metal layer is formed on entire surface of the gate insulation layer 218 so as to cover the active layer 220 and the ohmic contact layer 222 and then patterned to form the data lines 224, the source electrode 226 and the drain electrode 228. As with the first metal layer, the second metal layer is selected from aluminum (Al), aluminum alloy (e.g., AlNd), molybdenum (Mo), chromium (Cr), tungsten (W) and the like. As shown and mentioned with reference FIG. 3, the data lines 224 cross both the gate line 212 and the common line 216, and define the pixel regions P1 and P2 with the gate and common lines 212 and 216. The source electrode 226 extends from the data line 224 and overlaps a portion of the ohmic contact layer 220. After forming the source and drain electrodes 226 and 228, an exposed portion of the ohmic metal layer 222 is removed using the source and drain electrodes 226 and 228 as masks so as to expose a portion of the active layer 220 between the source and drain electrodes 226 and 228.

Figure 4C:
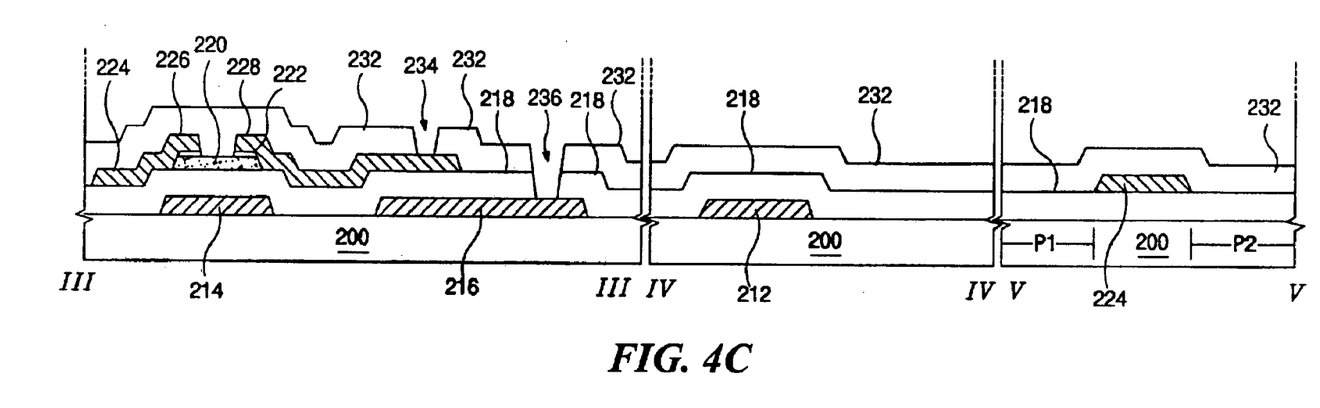

In FIG. 4C, a passivation layer 232 is formed on the gate insulation layer 218 to cover the patterned second metal layer (i.e., the data lines 224 and the source and drain electrodes 226 and 228). The passivation layer 232 is an inorganic substance, such as silicon nitride ($SiN_x$) or silicon oxide ($SiO_x$), or an organic substance, such as benzocyclobutene (BCB) or acryl-based resin. A patterning process is sequentially performed to form a drain contact hole 234 and a common contact hole 236. The drain contact hole 234 penetrates the passivation layer 232 to expose a portion of the drain electrode 228, and the common contact hole 236 penetrates both the passivation layer 232 and the gate insulation layer 218 to expose a portion of the common line 216.

Figure 4D:
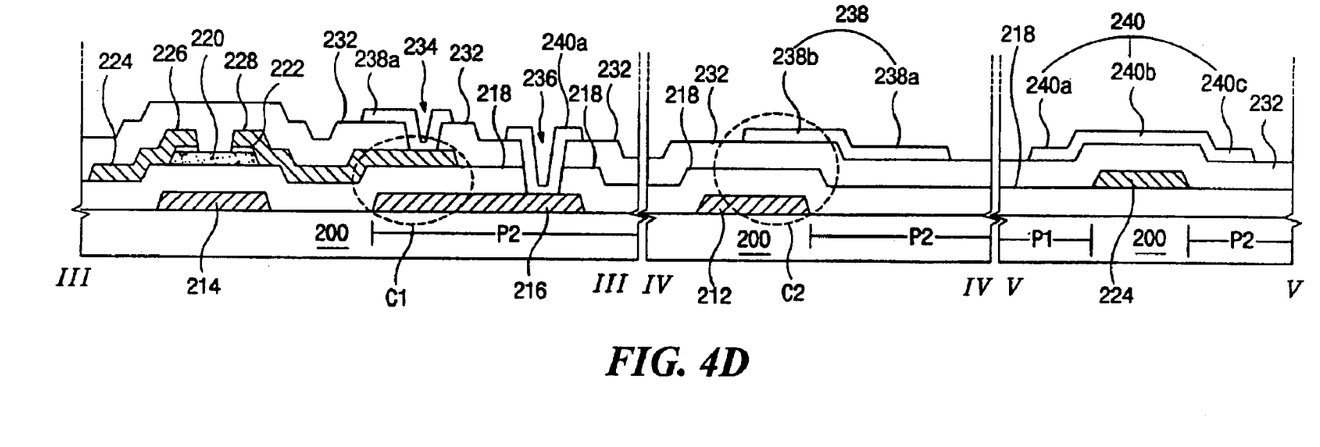

Next in FIG. 4D, a transparent conductive layer is formed on the passivation layer 232 and then patterned to form a pixel electrode 238 and a common electrode 240. The transparent conductive layer is indium tin oxide (ITO) or indium zinc oxide (IZO). The pixel electrode 238 includes a vertical portion 238a and a top horizontal portion 238b. As described hereinbefore, the vertical portion 238a crosses the second pixel region P2 and contacts the drain electrode 228 through the drain contact hole 234. The top horizontal portion 238b is disposed overlapping the gate line 212 and extends along the gate line 212. The common electrode 224 includes a first common electrode 240a, a common connector 240b and a second common electrode 240c. The first common electrode 240a is disposed in each pixel region P1 or P2 and contacts the common line 216 through the common contact hole 236. The first and second common electrodes 240a and 240c extend substantially parallel with the vertical portion 238a of the pixel electrode. The common connector 240b crosses the data lines 224 and connects the first common electrode 240a of the first pixel region P1 to the second common electrode 240c of the second pixel region P2.

Still referring to FIG. 4D, the common line 216 and the drain electrode 228 form a first storage capacitor C1 with the interposed gate insulation layer 218. In the first storage capacitor C1, the common line 216 acts as a first electrode, the drain electrode 228 acts as a second electrode, and the gate insulation layer 218 acts as a dielectric layer. Furthermore, the gate line 212 and the top horizontal portion 238b form a second storage capacitor C2 with the gate insulation layer 218 and the passivation layer 232 interposed therebetween. As with the first storage capacitor C1, the gate line 212 acts as a first electrode, the top horizontal portion 238b acts as a second electrode, and both the gate insulation layer 218 and the passivation layer 232 act as a dielectric layer.

Accordingly in the second embodiment, because the first storage capacitor is formed on the common line and the second storage capacitor is formed on the gate line, the array substrate can obtain an improved capacitance. Furthermore, since the transparent conductive material is used for the pixel and common electrodes and the distortion does not occur, the aperture ratio and brightness of the IPS-LCD can increase. The array substrate having the inventive structure and configuration can be adopted in the large IPS-LCD device so that the high image quality and resolution can be obtained.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for use in an IPS-LCD device, comprising:

a substrate;

gate and common lines on the substrate in a first direction;

a gate insulation layer on the substrate to cover the gate and common lines;

a data line on the gate insulation layer in a second direction substantially perpendicular to the gate and common lines;

a thin film transistor at a crossing of the gate and data lines, the thin film transistor including a gate electrode, an active layer, a source electrode, and a drain electrode;

a passivation layer on the gate insulation layer, the passivation layer covering the thin film transistor and the data line and having first and second contact holes therethrough;

a pixel electrode on the passivation layer, the pixel electrode contacting the drain electrode through the first contact hole; and a common electrode on the passivation layer, the common electrode contacting the common line through the second contact hole, wherein the common line and the drain electrode having the gate insulation layer interposed therebetween form a first storage capacitor, and wherein the pixel electrode and the gate line having the sate insulation layer and passivation layer interposed therebetween form a second storage capacitor.

2. The array substrate according to claim 1, wherein the drain electrode has a quadrangular portion over the common line so that the pixel electrode contacts the quadrangular portion through the first contact hole.

3. The array substrate according to claim 2, wherein the quadrangular portion of the drain electrode and the common electrode with the gate insulation layer interposed therebetween form the first storage capacitor.

4. The array substrate according to claim 3, wherein the common electrode includes a horizontal portion and a plurality of vertical portions.

5. The array substrate according to claim 4, wherein the plurality of vertical portions extend from the horizontal portion and one of the vertical portions contacts the common line through the second contact hole.

6. The array substrate according to claim 5, wherein the horizontal portion of the common electrode is disposed adjacent to and substantially parallel with the gate line and connects the plurality of vertical portions with those of neighboring pixels.

7. The array substrate according to claim 6, wherein the pixel electrode is disposed substantially parallel with the data line and between the vertical portions of the common electrode.

8. The array substrate according to claim 3, wherein the pixel electrode includes a vertical portion and atop horizontal portion, wherein the vertical portion crosses a pixel region and contacts the quadrangular portion of the drain electrode, and wherein the top horizontal portion is over the gate line and extends along the gate line.

9. The array substrate according to claim 8, wherein the top horizontal portion of the pixel electrode and the gate line form the second storage capacitor with the interposed gate insulation and passivation layers.

10. The array substrate according to claim 9, wherein the common electrode includes first and second common electrodes and a common connector, the first common electrode contacts the common line through the second contact hole, and the common connector connects the second common electrode to a common electrode of the neighboring pixel.

11. The array substrate according to claim 1, wherein the pixel and common electrodes includes one of indium tin oxide and indium zinc oxide.

12. A method of fabricating an array substrate for use in an IPS-LCD device, comprising:

forming gate and common lines on a substrate in a first direction;

forming a gate insulation layer on the substrate to cover the gate and common lines;

forming a data line on the gate insulation layer in a second direction substantially perpendicular to the gate and common lines;

forming a thin film transistor at a crossing of the gate and data lines, the thin film transistor including a gate electrode, an active layer, a source electrode, and a drain electrode;

forming a passivation layer on the gate insulation layer so as to cover the thin film transistor and the data line, the passivation layer having first and second contact holes;

forming a pixel electrode on the passivation layer, the pixel electrode contacting the drain electrode through the first contact hole; and forming a common electrode on the passivation layer, the common electrode contacting the common line through the second contact hole;

wherein the common line and the drain electrode having the gate insulation layer interposed therebetween form a first storage capacitor, and wherein the pixel electrode and the gate line having the gate insulation layer and passivation layer interposed therebetween form a second storage capacitor.

13. The method according to claim 12, wherein the drain electrode has a quadrangular portion over the common line so that the pixel electrode contacts the quadrangular portion through the first contact hole.

14. The method according to claim 13, wherein the quadrangular portion of the drain electrode and the common electrode with the gate insulation layer interposed therebetween form the first storage capacitor.

15. The method according to claim 14, wherein the common electrode includes a horizontal portion and a plurality of vertical portions.

16. The method according to claim 15, wherein the plurality of vertical portions extend from the horizontal portion and one of the vertical portions contacts the common line through the second contact hole.

17. The method according to claim 16, wherein the horizontal portion of the common electrode is disposed adjacent to and substantially parallel with the gate line and connects the plurality of vertical portions with those of neighboring pixels.

18. The method according to claim 17, wherein the pixel electrode is disposed substantially parallel with the data line and between the vertical portions of the common electrode.

19. The method according to claim 14, wherein the pixel electrode includes a vertical portion and a top horizontal portion, wherein the vertical portion crosses a pixel region and contacts the quadrangular portion of the drain electrode, and wherein the top horizontal portion is disposed over the gate line and extends along the gate line.

20. The method according to claim 19, wherein the top horizontal portion of the pixel electrode and the gate line with the interposed gate insulation and passivation layers form the second storage capacitor.

21. The method according to claim 20, wherein the common electrode includes first and second common electrodes and a common connector, the first common electrode contacts the common line through the second contact hole, and the common connector connects the second common electrode to a common electrode of a neighboring pixel.

22. The method according to claim 12, wherein the pixel and common electrodes includes one of indium tin oxide and indium zinc oxide.

* * * * *